United States Patent
Tabet et al.

(10) Patent No.: US 9,967,838 B2
(45) Date of Patent: May 8, 2018

(54) NETWORK SYNCHRONIZATION FOR SYSTEM CONFIGURATION EXCHANGES

(71) Applicant: Apple Inc., Cupertino, CA (US)

(72) Inventors: Tarik Tabet, Los Gatos, CA (US); Sarma V. Vangala, San Jose, CA (US); Rafael L. Rivera-Barreto, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 134 days.

(21) Appl. No.: 14/867,060

(22) Filed: Sep. 28, 2015

(65) Prior Publication Data
US 2016/0150494 A1    May 26, 2016

Related U.S. Application Data

(60) Provisional application No. 62/083,083, filed on Nov. 21, 2014.

(51) Int. Cl.
*H04W 56/00* (2009.01)
*H04W 76/04* (2009.01)
*H04L 5/00* (2006.01)
*H04W 88/02* (2009.01)
*H04W 88/08* (2009.01)

(52) U.S. Cl.
CPC ....... *H04W 56/0005* (2013.01); *H04L 5/0048* (2013.01); *H04W 76/046* (2013.01); *H04W 76/048* (2013.01); *H04W 88/02* (2013.01); *H04W 88/08* (2013.01)

(58) Field of Classification Search
CPC .......... H04W 56/0005; H04W 76/046; H04W 76/048; H04W 88/02; H04W 88/08
See application file for complete search history.

(56) References Cited

U.S. PATENT DOCUMENTS

| | | | |
|---|---|---|---|
| 8,750,186 B2 | 6/2014 | Oh et al. | |
| 2010/0110896 A1 | 5/2010 | Tseng et al. | |
| 2013/0003672 A1* | 1/2013 | Dinan | H04L 1/00 370/329 |
| 2013/0316720 A1* | 11/2013 | Dwyer | H04W 76/046 455/450 |
| 2014/0010136 A1 | 1/2014 | Somasundaram et al. | |
| 2014/0269480 A1* | 9/2014 | Han | H04W 76/048 370/311 |

* cited by examiner

*Primary Examiner* — Feben M Haile
(74) *Attorney, Agent, or Firm* — Meyertons Hood Kivlin Kowert & Goetzel, P.C.; Jeffrey C. Hood (57) ABSTRACT

This disclosure relates to techniques for avoiding loss of synchronization between a cellular device and a cellular network. According to some embodiments, a wireless device and a base station may perform a handshake procedure to select configuration parameters for cellular communication. The handshake procedure may establish a system frame number and subframe number at which the selected configuration parameters take effect. The wireless device and the base station may implement the selected configuration parameters at the selected system frame number and subframe number.

18 Claims, 5 Drawing Sheets

NETWORK SYNCHRONIZATION FOR SYSTEM CONFIGURATION EXCHANGES

PRIORITY INFORMATION

This application claims priority to U.S. provisional patent application Ser. No. 62/083,083, entitled "Network Synchronization for System Configuration Exchanges," filed Nov. 21, 2014, which is hereby incorporated by reference in its entirety as though fully and completely set forth herein.

FIELD

The present application relates to wireless devices, and more particularly to systems and methods for maintaining network synchronization of wireless devices in conjunction with system configuration exchanges.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications. Different applications utilizing cellular communication may have different characteristics. Cellular communication techniques which do not take into account the different application characteristics of the various applications utilizing cellular communication may be in danger of operating inefficiently. Accordingly, improvements in the field would be desirable.

SUMMARY

Embodiments are presented herein of systems, apparatuses, and methods for improving system synchronization in conjunction with exchanging system configuration information between a wireless device and a network.

For applications that utilize network communication, traffic patterns may vary from application to application, and due to the vast variety of possible applications, a single set of network communication configuration settings, or even a few such sets, may not suit all possible applications and devices. For example, different discontinuous reception configurations may be appropriate for different applications. Accordingly, application aware configuration and scheduling mechanisms may be used in certain cellular communication systems. This may reduce wireless device power consumption and improve network resource use efficiency while also meeting the needs of applications performing network communication.

One possible framework for agreeing upon such mutually beneficial system configuration settings may include the use of a handshake mechanism between a wireless device and a base station to negotiate them. Thus, according to some embodiments of this disclosure, a wireless device and a base station may perform such a handshake procedure to select certain configuration parameters for cellular communication between the wireless device and the base station.

In order to maintain synchronization between the wireless device and the base station, at least in some instances as part of the handshake procedure a time (e.g., a specific system frame number and subframe number) when the selected configuration parameters are to take effect may be selected. This may reduce the likelihood that one or the other of the wireless device or the base station put the selected configuration parameters into effect at different times, which could lead to an out-of-sync condition at the wireless device.

Various additional techniques for improving synchronization between a wireless device and a base station in conjunction with configuration parameter exchange are also described herein, including the use of a prohibit timer (e.g., for preventing excessively frequent configuration setting changes), default/fallback configuration settings (e.g., that may allow a wireless device to maintain radio resources even if a timing alignment timer expires), among other techniques.

The techniques described herein may be implemented in and/or used with a number of different types of devices, including but not limited to cellular phones, cellular base stations, tablet computers, wearable computing devices, portable media players, and any of various other computing devices.

This Summary is intended to provide a brief overview of some of the subject matter described in this document. Accordingly, it will be appreciated that the above-described features are merely Examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
GSM: Global System for Mobile Communications
GERAN: GSM EDGE Radio Access Network
UMTS: Universal Mobile Telecommunications System
UTRAN: UMTS Terrestrial Radio Access Network or Universal Terrestrial Radio Access Network
LTE: Long Term Evolution
RAN: Radio Access Network
E-UTRAN: Evolved UMTS Radio Access Network or Evolved Universal Radio Access Network
EPC: Evolved Packet Core
EPS: Evolved Packet Service
MME: Mobility Management Entity
HSS: Home Subscriber Server
RRC: Radio Resource Control
MAC: Media Access Control
IE: Information Element
PUCCH: Physical Uplink Control Channel
DRX: Discontinuous reception
UL: Uplink
DL: Downlink
OOS: Out-of-Sync
NW: Network Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
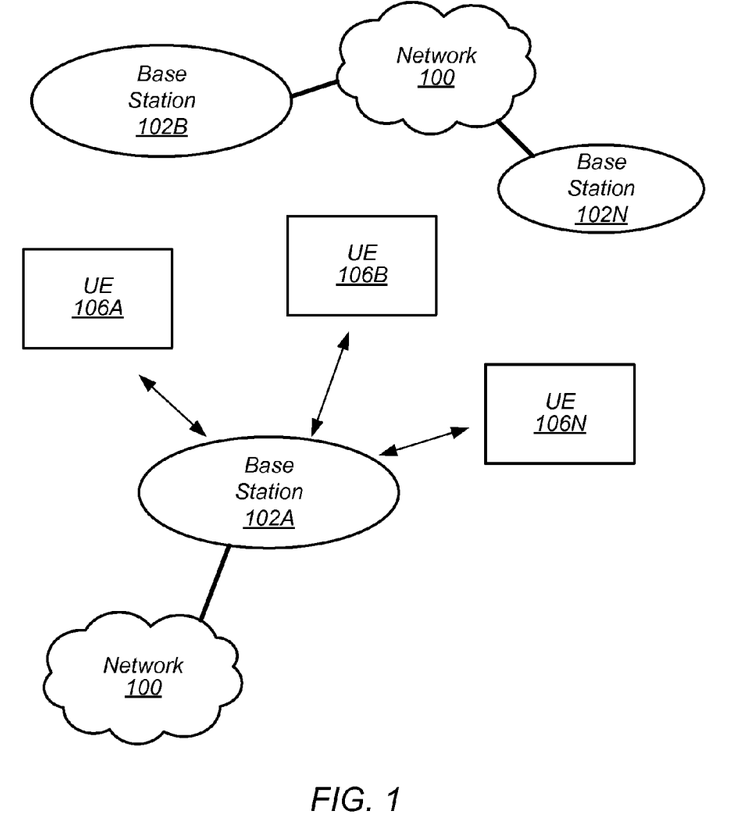
FIG. 1 illustrates an exemplary (and simplified) wireless communication system, according to some embodiments.
Figure 2:
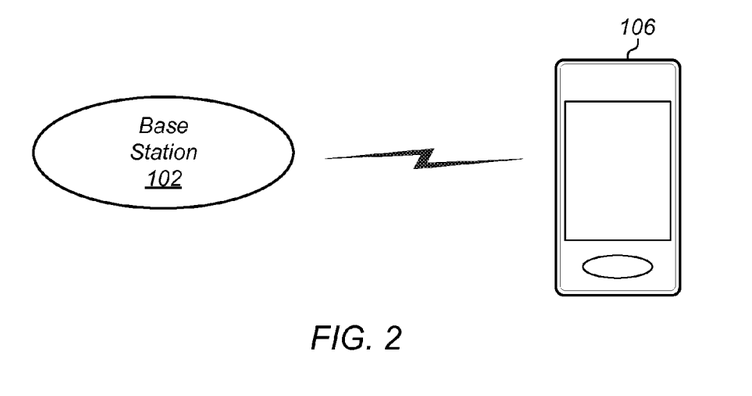
FIG. 2 illustrates a base station (BS) in communication with a user equipment (UE) device, according to some embodiments.
Figure 3:
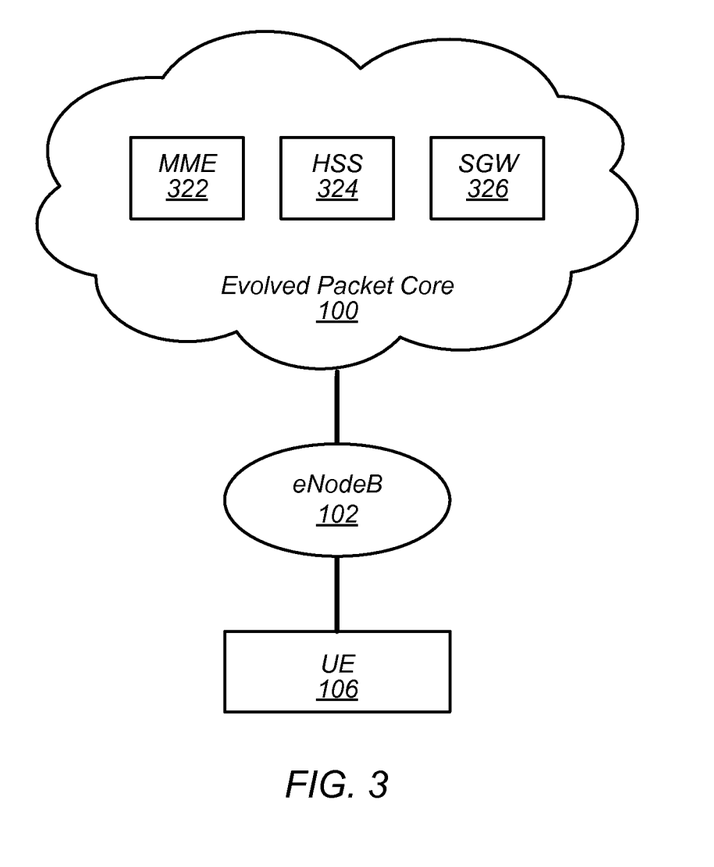
FIG. 3 illustrates an exemplary (and simplified) cellular network architecture, according to some embodiments.

FIGS. 1-3—Communication Systems

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site, and may include hardware that enables wireless communication with the UEs 106A through 106N. If the base station 102 is implemented in the context of LTE, it may alternately be referred to as an 'eNodeB'. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a wide geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to one embodiment. The UE 106 may be a device with cellular communication capability such as a mobile phone, a hand-held device, a wearable device, a computer or a tablet, or virtually any type of wireless device.

The UE 106 may include a processor that is configured to execute progRam instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using oNe or more wireless communication protocols or technologies. In one embodiment, the UE 106 might be configured to communicate using either of CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or Receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

FIG. 3 illustrates an exemplary, simplified portion of a wireless Communication system, such as a 3GPP compliant cellular network.

As shown, a UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, and serving gateway (SGW) 326. The EPC 100 may include various other devices and/or entities known to those skilled in the art as well.

Figure 4:
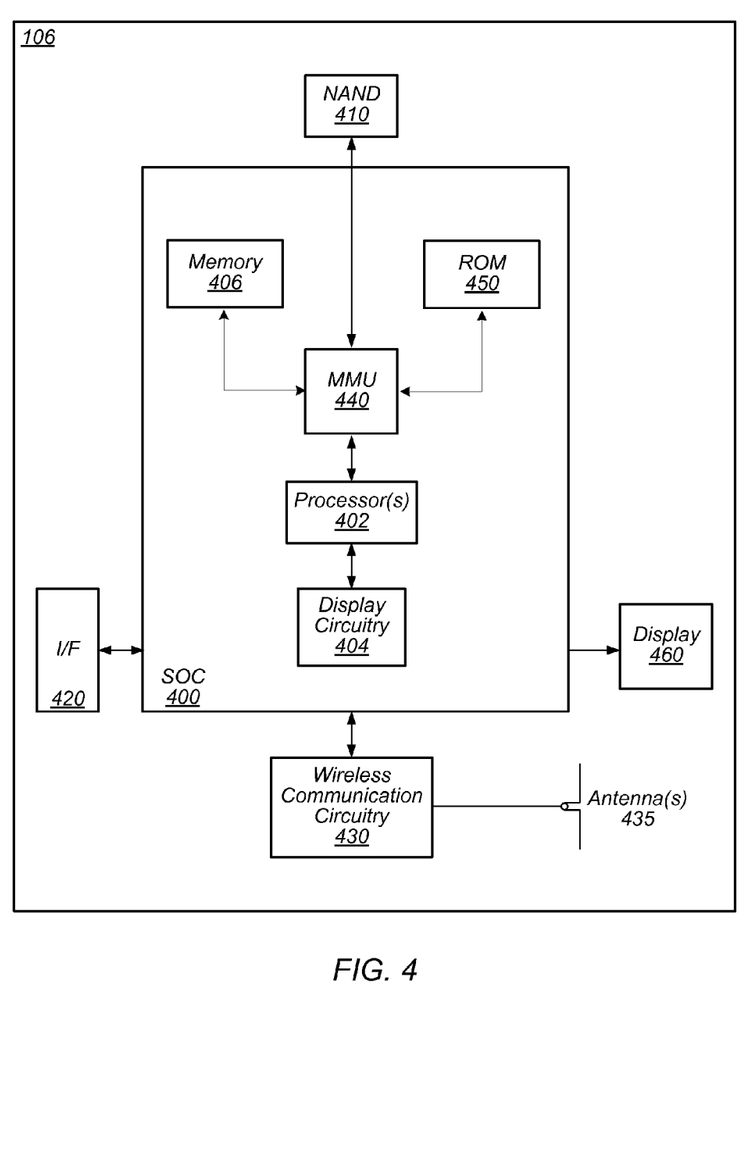
FIG. 4 illustrates an exemplary block diagram of a UE, according to some embodiments.

FIG. 4—Exemplary Block Diagram of a UE

FIG. 4 illustrates an exemplary block diagram of a UE 106, according to one embodiment. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, and wireless communication circuitry 430 (e.g., for LTE, CDMA2000, Bluetooth, WiFi, etc.).

The UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna(s) 335 to perform the wireless communication. As noted above, the UE 106 may be configured to communicate wirelessly using multiple wireless communication standards in some embodiments.

As described further subsequently herein, the UE 106 may include hardware and software components for implementing part or all of the methods described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
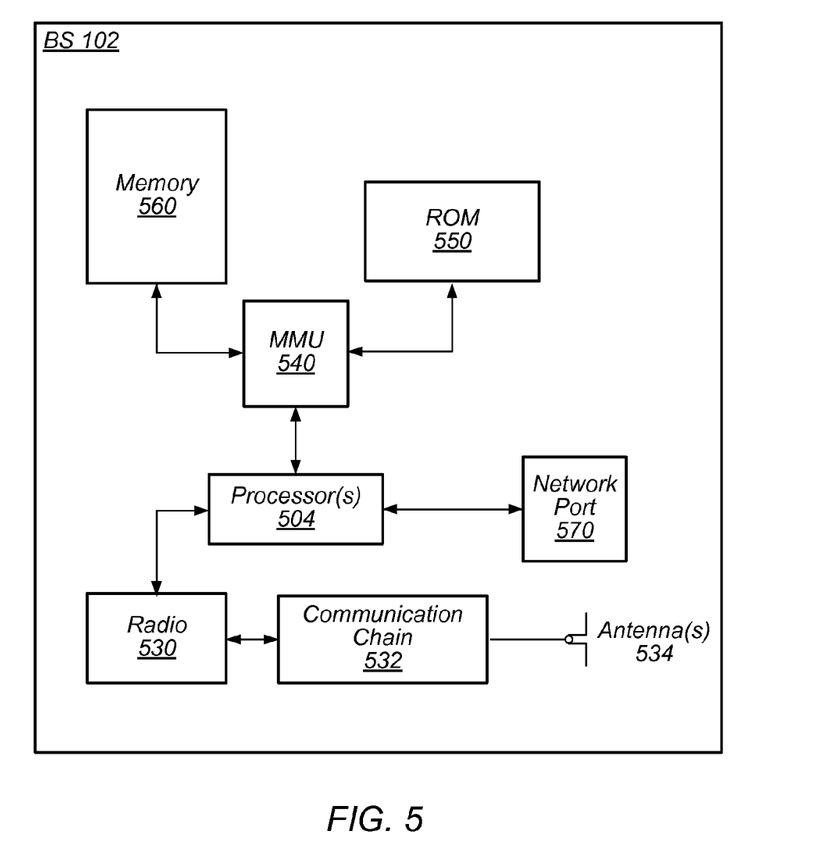
FIG. 5 illustrates an exemplary block diagram of a BS, according to some embodiments.

FIG. 5—Base Station

FIG. 5 illustrates an exemplary block diagram of a base station 102, according to one embodiment. It is noted that the base station of FIG. 5 is merely one example of a possible base station. As shown, the base station 102 may include processor(s) 504 which may execute program instructions for the base station 102. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The base station 102 may include at least one network port 570. The network port 570 may be configured to couple to a telephone network and provide a plurality of devices, such as UE devices 106, access to the telephone network as described herein above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The base station 102 may include at least one antenna 534, and possibly multiple antennas. The antenna(s) 534 may be configured to operate as a wireless transceiver and may be further configured to communicate with UE devices 106 via radio 530. The antenna 534 communicates with the radio 530 via communication chain 532. Communication chain 532 may be a receive chain, a transmit chain or both. The radio 530 may be configured to communicate via various wireless communication technologies, including, but not limited to, LTE, LTE-A, GSM, WCDMA, CDMA2000, Wi-Fi, etc.

The processor(s) 504 of the base station 102 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
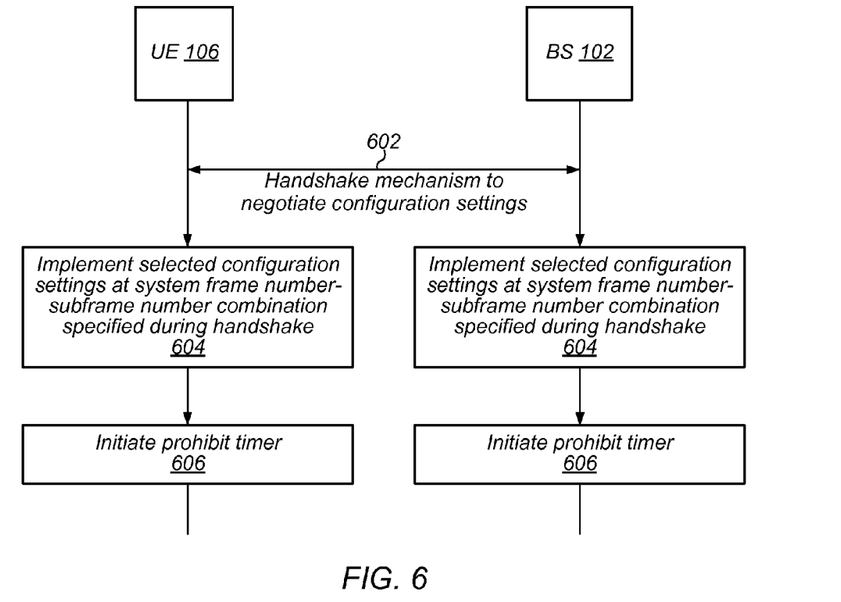
FIG. 6 is a communication flow diagram illustrating an exemplary method for exchanging system configuration information, according to some embodiments.
Figure 7:
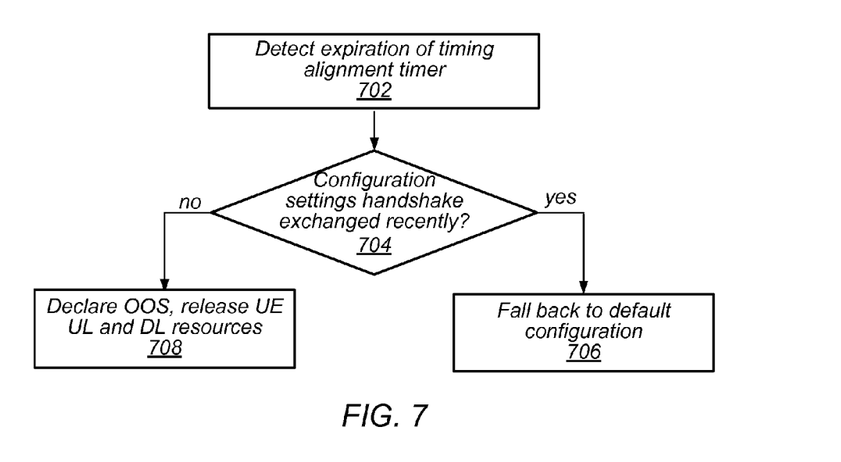
FIG. 7 is a flowchart diagram illustrating an exemplary method for providing a default DRX configuration fallback option for timing alignment expiration, according to some embodiments.

FIGS. 6-7—Communication & Flowchart Diagrams

In some cellular communication systems, such as LTE, a UE can operate in one of two modes, an idle mode and a connected mode. In the idle mode, Discontinuous Reception (DRX) allows the UE to switch off its radio receiver and thereby reduce its power consumption. The UE may typically enter the idle mode from the connected mode upon receiving a Radio Resource Control (RRC) connection release message from the network. In the connected mode a UE can be in active data transmission or in a connected DRX mode. In the connected DRX mode, communication between the UE and the network may follow a defined pattern of on and off cycles. A variety of DRX cycle lengths may be possible, including various "short" and "long" DRX cycles.

For applications that utilize network communication, traffic patterns may vary from application to application, and due to the vast variety of possible applications, a single set of network communication configuration settings, or even a few such sets, may not suit all possible applications and UEs. For example, different DRX (and/or other) configurations may be appropriate for different applications. Accordingly, application aware configuration and scheduling mechanisms may be used in certain cellular communication systems, e.g., to reduce power consumption at the UE and improve network resource use efficiency while also meeting the needs of applications active on the UE.

One possible framework for agreeing upon such mutually beneficial system configuration settings may include the use of a handshake mechanism between the UE and the network (by way of a BS) to negotiate them. However, if the framework is not carefully designed, it is possible that implementation of mutually agreed upon configuration settings during such a handshake mechanism may be offset in time between the UE and the BS, leading to the UE and the network being out of synchronization. For example, the network in such a case may indicate a new timing alignment timer (TAT) as part of such an exchange. A mismatch of TAT and DRX settings can cause the UE and the network to go out of sync with each other, thus causing the UE to have to perform a random access channel (RACH) procedure to re-connect.

Further, in the case of multiple applications requesting network resources, such exchanges could occur relatively frequently, potentially leading to further situations in which the network and the UE could become out of sync with each other. Accordingly, it may be desirable to include features for ensuring synchronization (or considered another way, reducing the probability of loss of synchronization) in conjunction with configuration settings exchanges between a UE and a BS in such a framework; FIG. 6 is a communication/signal flow diagram illustrating such a scheme for a exchanging configuration information between wireless devices and base stations with features for reducing out-of-sync conditions, according to one set of embodiments.

It should be noted that the term "out-of-sync" may refer to several types of events as used herein. A first type of event may include scenarios in which a UE either experiences radio link failure (RLF) or doesn't receive a timing advance command from the network prior to its timing alignment timer expiring. This may result in the RRC resources of the UE (including physical uplink control channel (PUCCH) resources) being released, in which case in order to connect to the network, a UE may attempt RRC re-establishment, involving a RACH procedure at the PHY/MAC level.

A second type of event may include scenarios in which a UE and network are exchanging configuration information, but the start of use of such configurations and their correct implementation by either party might be offset in time, causing the UE and the network to be out of synchronization. For example, a UE might be in an OFF period of C-DRX while the network assumes the UE should be in the OnDuration of C-DRX, if the two sides implement configuration timing in an offset manner.

A further out-of-sync scenario may occur if the network intentionally puts a UE into out-of-sync, for example by intentionally allowing the TAT for the UE to expire, in order to signal to the UE to return to/fall back to a default C-DRX configuration (e.g., a long C-DRX configuration), such as described further herein below with respect to FIG. 7.

The scheme shown in FIG. 6 may be used in conjunction with any of the computer systems or devices shown in the above Figures, among other devices. In various embodiments, some of the elements of the scheme shown may be performed concurrently, in a different order than shown, substituted for by other method elements, or may be omitted. Additional elements may also be performed as desired. As shown, the scheme may operate as follows.

In 602, a UE 106 and a BS 102 may exchange information in a handshake mechanism to negotiate one or more configuration settings for cellular communication between the UE 106 and the BS 102. At least in some instances, the handshake mechanism may facilitate the use of configuration settings by the UE 106 and the BS 102 which are suited to the application characteristics of one or more applications which are currently active on the UE 106; in other words, the configuration parameters may be selected based at least in part on application characteristics of one or more applications executing on the UE 106. Configuration parameters negotiated as part of the handshake may include, among various possibilities, any or all of DRX settings (short and/or long DRX cycle length/timer settings, DRX OnDuration settings, DRX inactivity timer settings, etc.), RRC inactivity timer or other inactivity timer settings, scheduling request (SR) configuration parameters, sounding reference symbol (SRS) configuration parameters, PUCCH configuration parameters, motion state parameters, power state parameters, etc.

As one possibility, the handshake mechanism may include an exchange of information during or after radio resource control (RRC) connection establishment. RRC information element(s) or media access control (MAC) control elements (CEs) may be exchanged as part of the handshake mechanism, among various possibilities. Other mechanisms are also possible.

As one possibility, the handshake mechanism may be initiated by the UE 106. For example, the UE 106 may transmit an indication of one or more preferred configuration parameters to the BS 102. The BS 102 may receive the indication from the UE 106 and transmit an indication of one or more selected configuration parameters to the UE 106. The UE 106 may receive the indication from the BS 102, and the UE 106 and the BS 102 may implement the selected configuration parameters. Note that the selected configuration parameters may be selected based at least in part on the indicated preferred configuration parameters. The UE or network might also in such conditions use non-standard or atypical Timing Alignment timer values (e.g., that are undefined in standards) through mutual agreement, for example so that they will never go out of sync with each other. If desired, the UE and the network could also agree upon using infinite TA Timers. However, it should be noted that this might lead to increased system loads on the BS 102's end.

As another possibility, the handshake mechanism may be initiated by the BS 102. For example, the BS 102 may transmit an indication of one or more possible configuration settings to the UE 106. The UE 106 may receive the indication from the BS 102 and transmit an indication of one or more preferred configuration settings to the BS 102. The BS 102 may receive the indication from the UE 106, and the UE 106 and the BS 102 may implement the preferred configuration settings.

As one possibility, the UE 106 and the BS 102 may be configured to implement the selected configuration settings immediately upon completion of the handshake procedure. However, in certain circumstances, it may be possible for the UE 106 and the BS 102 to unintentionally implement the configuration settings offset from each other in time in such a scenario. For example, there may be potential for one or more retransmissions (e.g., hybrid automatic repeat request (HARQ) retransmissions) to be performed as part of the handshake mechanism, which may result in offset implementation timing between the UE 106 and the BS 102. This could in turn lead to an out-of-sync condition between the UE 106 and the BS 102.

Accordingly, as one possible feature for reducing out-of-sync conditions resulting from such an exchange of configuration information between the UE 106 and the BS 102, an indication may be included (e.g., either in a message from the BS 102 to the UE 106, or in a message from the UE 106 to the BS 102) as part of the handshake procedure of a system frame number and subframe number in which to begin implementing the agreed-upon configuration settings.

Thus, according to the method of FIG. 6, in 604, the UE 106 and the BS 102 may implement the selected configuration settings at the system frame number—subframe number combination specified during the handshake. This may include beginning an agreed upon DRX configuration at the specified time, initiating a timing alignment timer at the specified time, and/or implementing any other selected configuration settings. This may remove any potential timing ambiguity with respect to when the selected configuration settings are implemented on each side, which may in turn result in fewer out-of-sync conditions occurring between the UE 106 and the BS 102. For example, any retransmissions at MAC may not result in out-of-sync scenarios in this case. An advantage of such an "aggressive" feature may include the ability of the UE and the network to rapidly/frequently change configuration parameters (for example, upon entry of any new application at the UE 106), potentially leading to very efficient power consumption profiles, without substantially increasing risk of out-of-sync conditions occurring.

As a still further potential (additional or alternative) feature for reducing out-of-sync conditions resulting from such an exchange of configuration information between the UE 106 and the BS 102, in 606 a "prohibit timer" may be implemented after such an exchange of configuration information, if desired. With the use of such a "non-aggressive" feature, it may be the case that entry of a new application at the UE 106 does not automatically cause a change/update of configuration parameters.

The prohibit timer may be used to prevent either or both of the UE 106 or the BS 102 from changing an agreed upon set of configuration parameters for a certain period of time after negotiating those parameters. For example, after implementing the configuration settings agreed upon during the handshake procedure, either or both of the UE 106 and the BS 102 may initiate a prohibit timer. Until the prohibit timer expires, neither may initiate another such handshake procedure to negotiate new configuration settings. Once the prohibit timer does expire, however, it may be the case that either side may initiate a new exchange. Such a feature may reduce the occurrence of out-of-sync scenarios by a substantial extent. However, in this case, it may be desirable to carefully regulate application combinations, for example so that a combination of cellular settings does not severely disrupt the usage of a newly entering application whose cellular settings are vastly different than that of a currently used application.

A further possible augmentation to the use of the prohibit timer may include the use of a confirmation period in conjunction with the prohibit timer. For example, the UE 106 might request a particular C-DRX configuration based on a current application running on the UE 106 in the handshake procedure. The network may accordingly implement the requested C-DRX configuration. The UE 106 may then initiate a confirmation timer and monitor the application to confirm that its traffic characteristics are indeed an appropriate match to the requested (and implemented) configuration for a period of time (e.g., corresponding to or less than the length of the confirmation timer). If the application characteristics do not match the selected configuration after all, the UE 106 may 'deny' the configuration and request a different configuration, at any time until the confirmation timer expires. Once the confirmation timer expires, if no denial is received from the UE 106, the BS 102 may infer that the configuration is acceptable and one or both of the UE 106 and the BS 102 may initiate the prohibit timer. As another possibility, if desired, the UE 106 may explicitly confirm that the configuration is acceptable prior to expiration of the confirmation timer, in which case the prohibit timer may be initiated prior to expiration of the confirmation timer.

FIG. 7 is a flowchart diagram illustrating a method for providing a default DRX configuration fallback option for timing alignment expiration, according to one embodiment. The method shown in FIG. 7 may be used in conjunction with any of the computer systems or devices (including either of a UE 106 or a BS 102) shown in the above Figures, among other devices. Note also that the features of the method of FIG. 7 may be implemented in conjunction with or independently of the features of the method of FIG. 6, as desired. In various embodiments, some of the elements of the scheme shown may be performed concurrently, in a different order than shown, substituted for by other method elements, or may be omitted. Additional elements may also be performed as desired. As shown, the scheme may operate as follows.

In 702, expiration of a timing alignment timer may be detected. The timing alignment timer (TAT) may generally be used to ensure that a UE 106 has received a timing advance command (TAC) sufficiently recently as to remain synchronized with the network.

In many instances, expiration of the TAT may result from a situation in which a UE 106 and a BS 102 have lost synchronization. As a result, TAT expiration may trigger an out-of-sync condition between the UE 106 and the BS 102, such that the RRC connection of the UE 106 may be released by the network such that all of the RRC resources (including PUCCH resources) assigned to the UE 106 are released. In this case, the UE 106 may be required to initiate a RACH procedure to obtain RRC resources anew before any further data exchange with the network.

However, in some instances, such as when frequently changing configuration settings (e.g., as a result of changing application usage at a UE 106) between the UE 106 and the BS 102, TAT expiration may occur even when timing synchronization between the UE 106 and the BS 102 has not degraded sufficiently as to require releasing all of the UL and DL resources of the UE 106 and forcing the UE 106 to perform a RACH procedure to re-acquire such resources. An alternate option in such a case might include configuring the UE 106 such as to fall back to a default configuration, such that at least some uplink resources are retained by the UE 106.

Accordingly, in 704, it may be determined whether a configuration settings handshake was recently exchanged between the BS 102 and the UE 106. For example, if a configuration settings handshake was exchanged within a certain time threshold (as may be measured by a timer, if desired), it may be determined that a configuration settings handshake was recently exchanged between the BS 102 and the UE 106 (in which case the method may proceed to step 706), while if a configuration settings handshake was not exchanged within the time threshold, it may be determined that a configuration settings handshake was not recently exchanged between the BS 102 and the UE 106 (in which case the method may proceed to step 708).

In 706, the UE 106 and the BS 102 may fall back to a default configuration. The default configuration may include default DRX settings, among various configuration settings. In this case, the UE 106 may retain sufficient UL (e.g., PUCCH) resources to allow the UE to make a scheduling request (SR) and continue connected-mode communication with the network. This may allow the UE to more quickly continue and complete existing transmissions, and may be beneficial in terms of both user experience and in terms of power at the UE 106, as a RACH procedure may not be necessary in case of slight mis-alignment and would extend the active period of the UE.

In 708, the UE 106 and the BS 102 may be declared out of sync (OOS), and the RRC connection (including uplink and downlink resources) of the UE 106 may be released. In this case, the UE 106 may perform a RACH procedure in order to resume connected-mode communication with the network.

Note that provision of such a feature may allow the BS 102 to intentionally allow the TAT for a UE 106 to expire in order to put the UE 106 into the default configuration, for example due to changing application conditions at the UE 106, rather than because it was not able to estimate UE 106 timing.

In the following further exemplary embodiments are provided.

One set of embodiments may include a method, comprising: by a wireless user equipment (UE) device: performing a handshake procedure with a cellular base station (BS) to exchange configuration parameters for cellular communication between the UE and the BS, wherein the selected configuration parameters comprise at least discontinuous reception configuration parameters, wherein performing the handshake procedure comprises indicating a system frame number and subframe number at which the selected configuration parameters take effect; starting discontinuous reception operation according to the configuration parameters at the indicated system frame number and subframe number; and starting a timing alignment timer at the indicated system frame number and subframe number.

Another set of embodiments may include a method, comprising: by a wireless user equipment (UE) device: performing a handshake procedure with a cellular base station (BS) to exchange configuration parameters for cellular communication between the UE and the BS.

According to some embodiments, the selected configuration parameters comprise at least discontinuous reception configuration parameters.

According to some embodiments, performing the handshake procedure comprises indicating a system frame number and subframe number at which the selected configuration parameters take effect.

According to some embodiments, the method further comprises: starting discontinuous reception operation according to the configuration parameters at the indicated system frame number and subframe number; and starting a timing alignment timer at the indicated system frame number and subframe number.

According to some embodiments, the method further comprises: initiating a prohibit timer based on the handshake procedure, wherein before expiration of the prohibit timer the UE and the BS are prohibited from changing the selected configuration parameters.

According to some embodiments, the method further comprises: initiating a confirmation timer based on the handshake procedure, wherein the prohibit timer is initiated upon expiration of the confirmation timer or if the selected configuration parameters are confirmed prior to expiration of the confirmation timer.

According to some embodiments, the method further comprises: determining that a timing alignment timer expiration has occurred; falling back to a default DRX configuration based on the timing alignment timer expiration if a handshake procedure to exchange configuration parameters between the UE and the BS has occurred within a predetermined period of time; releasing all uplink and downlink resources if no handshake procedure to exchange configuration parameters between the UE and the BS has occurred within the predetermined period of time.

According to some embodiments, the configuration parameters comprise one or more of: physical uplink control channel (PUCCH) configuration parameters; sounding reference symbol (SRS) configuration parameters; scheduling request (SR) configuration parameters; RRC inactivity timer settings; DRX inactivity timer settings; short DRX cycle timer settings; DRX OnDuration settings; or one or more other DRX settings.

According to some embodiments, the handshake procedure comprises: transmitting an indication of one or more preferred configuration parameters to the BS; receiving an indication of one or more selected configuration parameters from the base station, wherein the selected configuration parameters are selected based at least in part on the indicated preferred configuration parameters; transmitting a confirmation of the selected configuration parameters to the base station.

According to some embodiments, the handshake procedure comprises: receiving an indication of the one or more possible configuration settings from the BS; transmitting an indication of one or more preferred configuration settings to the BS in response to the indicated possible configuration settings; and implementing the preferred configuration settings during cellular communication with the BS.

According to some embodiments, the handshake procedure comprises exchanging media access control (MAC) control elements (CEs) between the UE and the BS.

According to some embodiments, the configuration parameters are selected based at least in part on application characteristics of one or more applications executing on the UE.

A further set of embodiments may include a wireless user equipment (UE) device, comprising: a radio; and an processing element operably coupled to the radio; wherein the UE is configured to implement any of the methods of the preceding examples.

Yet another set of embodiments may include a method, comprising: by a cellular base station (BS): performing a handshake procedure with a wireless user equipment (UE) device to exchange configuration parameters for cellular communication between the UE and the BS.

According to some embodiments, the selected configuration parameters comprise at least discontinuous reception configuration parameters.

According to some embodiments, performing the handshake procedure comprises indicating a system frame number and subframe number at which the selected configuration parameters take effect.

According to some embodiments, the method further comprises: starting discontinuous reception operation with the UE according to the configuration parameters at the indicated system frame number and subframe number; and starting a timing alignment timer for the UE at the indicated system frame number and subframe number.

According to some embodiments, the method further comprises: initiating a prohibit timer based on the handshake procedure, wherein before expiration of the prohibit timer the UE and the BS are prohibited from changing the selected configuration parameters.

According to some embodiments, the method further comprises: initiating a confirmation timer based on the handshake procedure, wherein the prohibit timer is initiated upon expiration of the confirmation timer or if the selected configuration parameters are confirmed prior to expiration of the confirmation timer.

According to some embodiments, the method further comprises: determining that a timing alignment timer expiration has occurred; falling back to a default DRX configuration with the UE based on the timing alignment timer expiration if a handshake procedure to exchange configuration parameters between the UE and the BS has occurred within a predetermined period of time; releasing all uplink and downlink resources of the UE if no handshake procedure to exchange configuration parameters between the UE and the BS has occurred within the predetermined period of time.

According to some embodiments, the configuration parameters comprise one or more of: physical uplink control channel (PUCCH) configuration parameters; sounding reference symbol (SRS) configuration parameters; scheduling request (SR) configuration parameters; RRC inactivity timer settings; DRX inactivity timer settings; short DRX cycle timer settings; DRX OnDuration settings; or one or more other DRX settings.

According to some embodiments, the handshake procedure comprises: receiving an indication of the one or more preferred configuration parameters from the UE; transmitting an indication of one or more selected configuration parameters to the UE, wherein the selected configuration parameters are selected based at least in part on the indicated preferred configuration parameters; receiving a confirmation of the selected configuration parameters from the UE.

According to some embodiments, the handshake procedure comprises: transmitting an indication of the one or more possible configuration settings to the UE; receiving an indication of one or more preferred configuration settings from the UE in response to the indicated possible configuration; and implementing the preferred configuration settings during cellular communication with the UE.

According to some embodiments, the handshake procedure comprises exchanging media access control (MAC) control elements (CEs) between the UE and the BS.

According to some embodiments, the configuration parameters are selected based at least in part on application characteristics of one or more applications executing on the UE.

Another set of embodiments may include a cellular base station (BS), comprising: a radio; and a processing element operably coupled to the radio; wherein the BS is configured to implement any of the methods of the preceding examples.

A further exemplary set of embodiments may include a non-transitory computer accessible memory medium comprising program instructions which, when executed at a device, cause the device to implement any or all parts of any of the methods of the preceding examples.

A still further exemplary set of embodiments may include a computer program comprising instructions for performing any or all parts of any of the methods of the preceding examples.

Yet another exemplary set of embodiments may include an apparatus comprising means for performing any or all of the method elements of any of the preceding examples.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. An apparatus, comprising:
a processing element configured to:
perform a handshake procedure with a cellular base station (BS) to exchange configuration parameters for cellular communication between a user equipment (UE) and the BS, wherein the selected configuration parameters comprise at least discontinuous reception configuration parameters;
initiate discontinuous reception operation according to the configuration parameters;
initiate a timing alignment timer;
determine that the timing alignment timer has expired;
fall back to a default discontinuous reception configuration based on the timing alignment timer expiration if a handshake procedure to exchange configuration parameters between the UE device and the BS has occurred within a predetermined period of time; and
release all uplink and downlink resources if no handshake procedure to exchange configuration parameters between the EE device and the BS has occurred within the predetermined period of time.
2. The apparatus of claim 1, wherein the processing element is further configured to:

initiate a prohibit timer based on the handshake procedure, wherein before expiration of the prohibit timer the apparatus and the BS are prohibited from changing the selected configuration parameters.

3. The apparatus of claim 2, wherein the processing element is further configured to:
   initiate a confirmation timer based on the handshake procedure,
   wherein the prohibit timer is initiated upon expiration of the confirmation timer or if the selected configuration parameters are confirmed prior to expiration of the confirmation timer.

4. The apparatus of claim 1, wherein the configuration parameters comprise one or more of:
   physical uplink control channel (PUCCH) configuration parameters;
   sounding reference symbol (SRS) configuration parameters;
   scheduling request (SR) configuration parameters;
   RRC inactivity timer settings;
   DRX inactivity timer settings;
   short DRX cycle timer settings;
   DRX OnDuration settings; or
   one or more other DRX settings.

5. The apparatus of claim 1, wherein the handshake procedure comprises:
   transmitting an indication of one or more preferred configuration parameters to the BS;
   receiving an indication of one or more selected configuration parameters from the base station, wherein the selected configuration parameters are selected based at least in part on the indicated preferred configuration parameters;
   transmitting a confirmation of the selected configuration parameters to the base station.

6. The apparatus of claim 1, wherein the handshake procedure comprises:
   receiving an indication of one or more possible configuration settings from the BS;
   transmitting an indication of one or more preferred configuration settings to the BS in response to the indicated possible configuration settings; and
   implementing the preferred configuration settings during cellular communication with the BS.

7. The apparatus of claim 1, wherein the handshake procedure comprises exchanging media access control (MAC) control elements (CEs) between the apparatus and the BS.

8. The apparatus of claim 1, wherein the configuration parameters are selected based at least in part on application characteristics of one or more applications executing on the apparatus.

9. A wireless user equipment (UE) device, comprising:
   an antenna;
   a radio coupled to the antenna; and
   a processing element coupled to the radio;
   wherein the UE device is configured to:
      perform a handshake procedure with a cellular base station (BS) to exchange configuration parameters for cellular communication between the UE device and the BS;
      implement the selected configuration parameters;
      determine that a timing alignment timer expiration has occurred;
      fall back to a default discontinuous reception configuration based on the timing alignment timer expiration if a handshake procedure to exchange configuration parameters between the UE device and the BS has occurred within a predetermined period of time; and
      release all uplink and downlink resources if no handshake procedure to exchange configuration parameters between the UE device and the BS has occurred within the predetermined period of time.

10. The UE device of claim 9,
   wherein the handshake procedure specifies a system frame number and subframe number at which the selected configuration parameters take effect,
   wherein the UE device is further configured to implement the selected configuration parameters at the specified system frame number and subframe number.

11. The UE device of claim 10, wherein the selected configuration parameters comprise at least discontinuous reception configuration parameters, wherein the UE device is further configured to:
   start discontinuous reception operation according to the configuration parameters at the specified system frame number and subframe number; and
   start the timing alignment timer at the specified system frame number and subframe number.

12. A cellular base station (BS), comprising:
   an antenna;
   a radio coupled to the antenna;
   a processing element;
   wherein the BS is configured to:
      perform a handshake procedure with a wireless user equipment (UE) device to exchange configuration parameters for cellular communication between the UE device and the BS;
      determine that a timing alignment timer expiration has occurred;
      fall back to a default DRX configuration with the UE device based on the timing alignment timer expiration if a handshake procedure to exchange configuration parameters between the UE device and the BS has occurred within a predetermined period of time; and
      release all uplink and downlink resources of the UE device if no handshake procedure to exchange configuration parameters between the UE device and the BS has occurred within the predetermined period of time.

13. The BS of claim 12, wherein the BS is further configured to:
   start discontinuous reception operation with the UE device according to the configuration parameters at the specified system frame number and subframe number; and
   start the timing alignment timer for the UE device at the specified system frame number and subframe number.

14. The BS of claim 12, wherein the BS is further configured to:
   initiate a prohibit timer based on the handshake procedure, wherein before expiration of the prohibit timer the UE device and the BS are prohibited from changing the selected configuration parameters.

15. The BS of claim 14, wherein the BS is further configured to:
   initiate a confirmation timer based on the handshake procedure,
   wherein the prohibit timer is initiated upon expiration of the confirmation timer or if the selected configuration parameters are confirmed prior to expiration of the confirmation timer.

16. The BS of claim 12, wherein to perform the handshake procedure, the BS is further configured to:
- receive an indication of one or more preferred configuration parameters from the UE device;
- transmit an indication of one or more selected configuration parameters to the UE device, wherein the selected configuration parameters are selected based at least in part on the indicated preferred configuration parameters;
- receive a confirmation of the selected configuration parameters from the UE device.

17. The BS of claim 12, wherein to perform the handshake procedure, the BS is further configured to:
- transmit an indication of one or more possible configuration settings to the UE device;
- receive an indication of one or more preferred configuration settings from the UE device in response to the indicated possible configuration
- implement the preferred configuration settings during cellular communication with the UE device.

18. The B S of claim 12, wherein the configuration parameters are selected based at least in part on application characteristics of one or more applications executing on the UE device.

* * * * *

UNITED STATES PATENT AND TRADEMARK OFFICE
CERTIFICATE OF CORRECTION

PATENT NO. : 9,967,838 B2
APPLICATION NO. : 14/867060
DATED : May 8, 2018
INVENTOR(S) : Tarik Tabet, Sarma V. Vangala and Rafael L. Rivera-Barreto It is certified that error appears in the above-identified patent and that said Letters Patent is hereby corrected as shown below:

In the Claims

Claim 1, Column 16, Line 64, please delete "between the EE device and the BS has occurred within" and insert --between the UE device and the BS has occurred within--.

Signed and Sealed this
Fourteenth Day of April, 2020

Andrei Iancu
*Director of the United States Patent and Trademark Office*